US010609178B2

(12) United States Patent
Navarro et al.

(10) Patent No.: US 10,609,178 B2
(45) Date of Patent: Mar. 31, 2020

(54) DIGITAL MEDIA AND MULTIMEDIA SCHEDULING AND DELIVERY PLATFORM

(71) Applicants: Ronaldo Cordero Navarro, Hacienda Heights, CA (US); Gerardo Cervantes, Pomona, CA (US); Jocelyn Co, Chino, CA (US)

(72) Inventors: Ronaldo Cordero Navarro, Hacienda Heights, CA (US); Gerardo Cervantes, Pomona, CA (US); Jocelyn Co, Chino, CA (US)

( * ) Notice: Subject to any disclaimer, the term of this patent is extended or adjusted under 35 U.S.C. 154(b) by 77 days.

(21) Appl. No.: 15/924,159

(22) Filed: Mar. 16, 2018

(65) Prior Publication Data

US 2018/0309844 A1    Oct. 25, 2018

Related U.S. Application Data

(60) Provisional application No. 62/472,049, filed on Mar. 16, 2017.

(51) Int. Cl.
*H04L 29/08*    (2006.01)
*H04L 29/06*    (2006.01)

(52) U.S. Cl.
CPC .......... *H04L 67/32* (2013.01); *H04L 65/4084* (2013.01); *H04L 65/607* (2013.01); *H04L 67/306* (2013.01); *H04L 67/325* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 9,602,848 B2 * | 3/2017 | Stone | H04N 21/23418 |
| 9,854,017 B2 * | 12/2017 | Gogoi | H04L 65/601 |
| 2005/0262257 A1 * | 11/2005 | Major | H04N 21/25808 |
| | | | 709/231 |

* cited by examiner

*Primary Examiner* — Cai Y Chen

(57) ABSTRACT

The system is a self-serve platform, which delivers user uploaded media and multimedia files, of varying playback duration, to a client computer connected to a digital display; which is set to receive executions for a scheduled playlist and punctually presents the playback of media and/or multimedia files in said playlist record. The system's included functions for schedule generation, schedule selection, and playlist creation contain unique, and embedded automatic functions-making the scheduling and delivery of media and multimedia files reliable, accessible, and cost efficient.

4 Claims, 2 Drawing Sheets

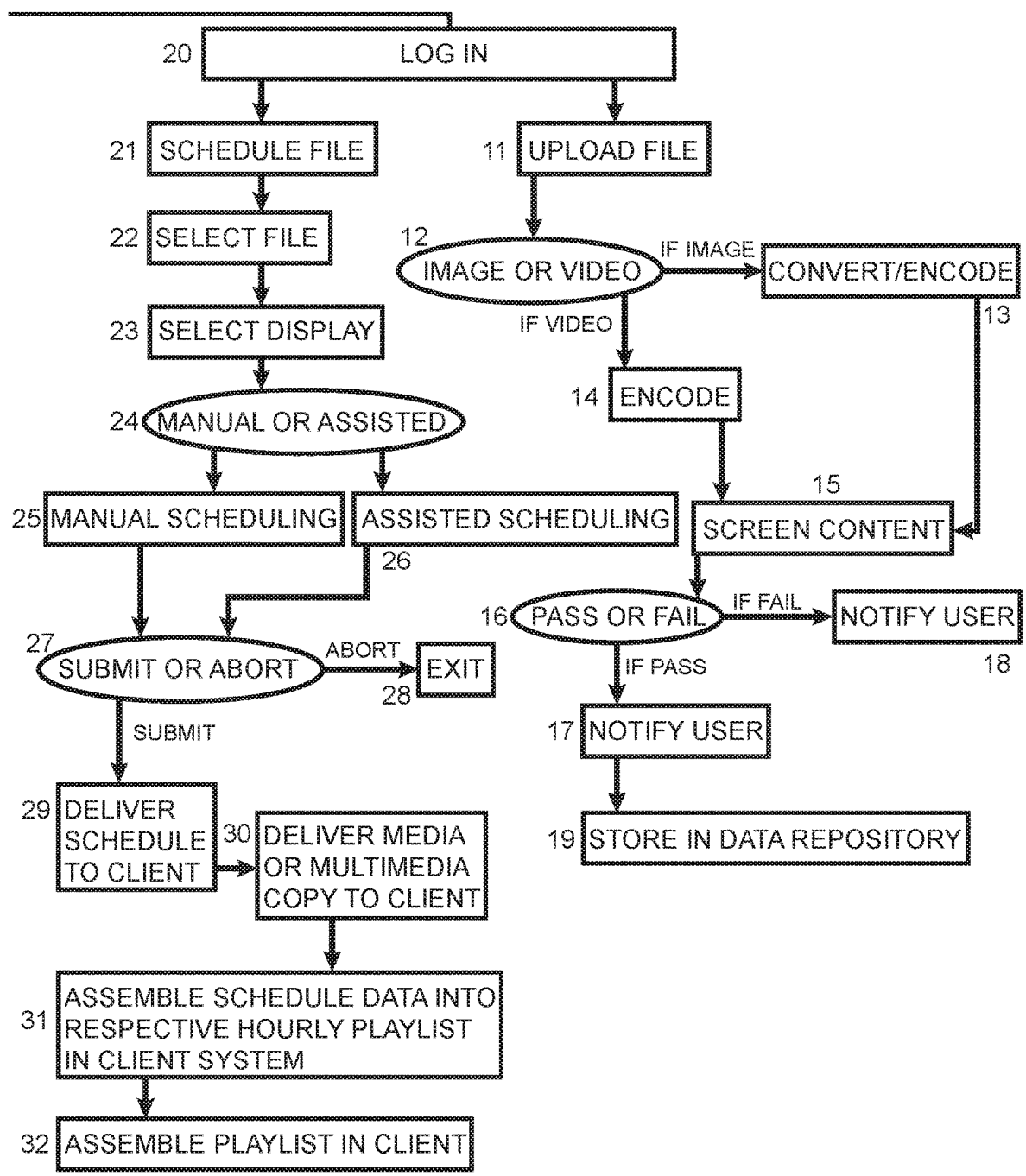

DIGITAL MEDIA AND MULTIMEDIA SCHEDULING AND DELIVERY PLATFORM

RELATED U.S. APPLICATION DATA

This application claims the benefit of U.S. Provisional Application No. 62/472,049, filed on Mar. 16, 2017. U.S. Provisional Application No. 62/472,049 is hereby incorporated by reference in its entirety.

BACKGROUND

1. Field of Invention

The disclosure generally relates to the field of media and multimedia presentation and distribution systems, and more specifically, to creating a system with autonomous components to schedule and present media and multimedia of varying duration.

2. Description of Related Art

Out-of-home advertising, OOH, incorporates a variety of different means to present advertisements and create brand recognition; specifically, as relating to the art, in the form of static images, digital presentation of static images with set durations or exposure times, and more sophisticated digital presentation of video media. The widespread practice of using posters and billboards for advertising has slowly evolved to incorporate the use of more dynamic digital systems, these systems may feature engaging visual effects via digital signage such as digital posters, digital billboards, and even small digital displays.

While digital signage is more engaging and certain companies do offer viable means for private individuals and businesses to advertise digitally, these companies share common disadvantages that are unfortunately passed along to the advertiser. Many of these companies require time consuming and out-of-date practices, including: require person to person dialogue and correspondence to figure out scheduling, require expensive investments such as large digital billboards which limits overall scalability reach, place large restrictions on the file types accepted, enforce unfair bidding systems that limit accessibility to many due to the very expensive and obscure rates, and lack automation and novelty that can lower rates and improve accessibility.

In general, the current state of the art lacks sophisticated automation processes that would improve accessibility, lacks a structure that can provide transparent scheduling with pricing, lacks a signage system that accept submittal of various media and multimedia file types of varying duration, and lacks a sustainable growth model due to the large capital investments required on for business that rely on digital billboards.

BRIEF SUMMARY OF THE INVENTION

To address the disadvantages of current digital signage systems involved with digital advertisement placements, the system offers an accessible internet platform that allows users to simply create an account, upload their media or multimedia file(s) (advertisement(s) or announcement(s),) and individually schedule said file or files for playback on a digital display or selection of digital displays, available in client network. With this type of system, various file formats are accepted, and due to the encoding process will allow users to upload image and video files alike, and schedule them to same schedule for presentation on the same digital display-if so desired. The system does not incorporate a bidding system, and due to the automated nature, will have low running costs to operate—passing along the savings to the advertisers. Scalability costs will also be low for the system, due to majority of the digital displays available in the client network are planned to be small displays for mainly indoor with some outdoor use.

BRIEF DESCRIPTION OF DRAWINGS

FIG. 1B depicts the accompanying partial view of the same embodiment of the system in which the third main module, LOG IN, is illustrated.

DETAILED DESCRIPTION

Figure 1A:
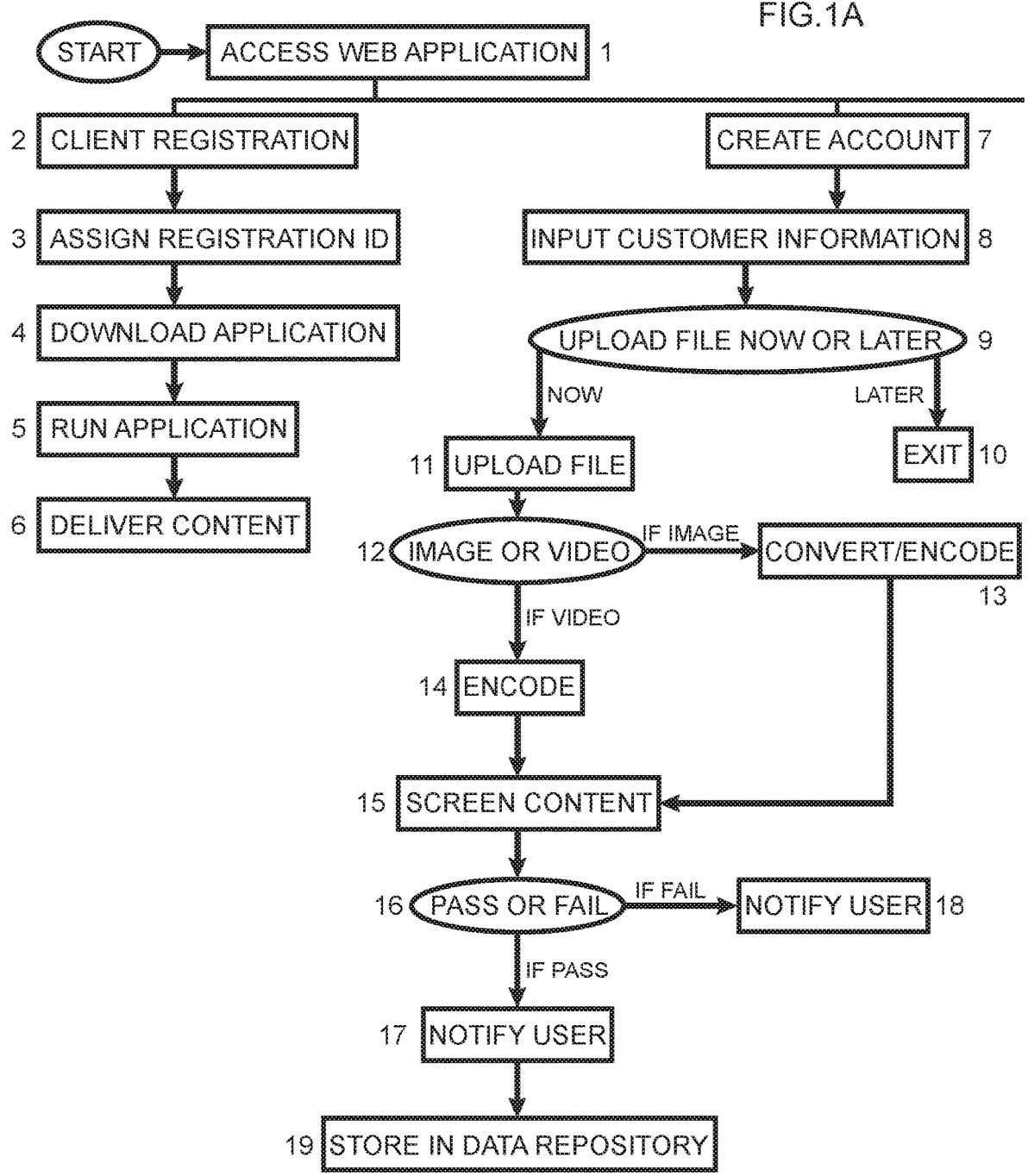
FIG. 1A depicts a partial view of one embodiment of the system in which two out of three main modules, CLIENT REGISTRATION and CREATE ACCOUNT, are illustrated.

The system includes a CLIENT REGISTRATION module 2, that allows a windows-based client computer, connected to an external digital display or a series of digital displays (that produced a scaled display,) to establish connection to the server. The system creates a unique registration ID number illustrated in submodule ASSIGN REGISTRATION ID 3, for the respective client computer and stores this unique identifier in a database. The operator of the respective client computer is prompted to download the client application 4 through the website. Upon installation of the client application, the application runs 5, and the client computer's registration ID is verified to establish initial connection with the server. Upon successful registration, the server delivers pre-prepared filler files 6 (media and multimedia content) to a designated storage in the client computer. This enables the client computer to commence display of respective filler files, pending playlist orders from scheduled media and multimedia from respective user or users.

The system further includes a CREATE ACCOUNT module 7, that allows any user to create an account, which enables the user to upload and schedule their respective media and or multimedia for playback on registered client digital displays. After submission of pertinent user account information 8, such as email address, business name, business address, and phone number, the user's account is activated, and the user is prompted to either upload their media and/or multimedia file(s), to continue the session, or they can choose to upload at a later time 9. If the user decides to upload their media and/or multimedia file(s) at a later time, the user can end the session 10. If the user chooses to upload their media and/or multimedia file(s) 11, the user is prompted to select between uploading an image or a video 12.

If the user selects to upload an image file 13, the user is prompted to assign a desired playback duration for said file. The system encodes said image file into a video file, in MP4 format with the H.264 codec, that has attributed playback duration that the user assigned in previous step. If the user selects to upload a video file, the system encodes said video file with its respective file property attributed duration, in MP4 format with H.264 codec. The duration info, along with other pertinent data of the encoded file is written to a record in a designated data file on the server. The respective video file is stored in a separate storage on the server.

An additional process involved with the ENCODE submodule 14 is an edit process that truncates a temporal length that equates to the transition time that is imposed by media player between playback of scheduled files. This process is necessary for maintaining scheduled start times in a punctual manner and maintains schedule integrity of respective playlists executed by the client application.

The system then moves the encoded file to a data file intended for access by the screening process 15, wherein the encoded files are accessed for manual screening through a server application. Screening is based on a video file content's subject matter, any resulting technical issues during encoding, and accurate metadata; and is approved or denied based on internal protocols. Each encoded file is assigned a pass or fail classification 16. The user is then notified of respective status by email and/or SMS 17 and 18, respectively. A pass classification allows the user to proceed to schedule the respective media or multimedia file. A fail classification denotes an end to the cycle for that respective file. The file is then stored 19 in a specific data file in the server's data repository, which contains copies of all screened files regardless of respective status.

FIG. 1B depicts the third main module involving the LOG IN procedure 20. It also includes submodules 11-19, which are the same submodules found in FIG. 1A. Said submodules 11-19 are also depicted in FIG. 1B as required processes by said LOG IN procedure. Submodule SCHEDULE FILE, 21 is further described below.

Upon user selection of their respective media or multimedia file, illustrated in submodule SCHEDULE FILE 21, if said user only has one media or multimedia file attributed to their respective account, system pre-selects 22 said user's media or multimedia file; and is then prompted to select the target digital display, wherein client application assembles. If said user has more than one media and/or multimedia file attributed to their respective account, the system provides a drop-down list of said user's media and/multimedia files available for selection 22.

Said user is then prompted to select the digital display 23 that the user wishes to schedule playback of their selected media or multimedia file. The availability of digital displays is subject to the user's media or multimedia file's conformity to respective display's requirements concerning: orientation and sizing of display's screen, content subject matter, and metadata accuracy.

Upon user's digital display selection, user is prompted to select 24 either a manual process of scheduling or an assisted process of scheduling their respective media or multimedia file. If manual scheduling 25 is selected, the system will prompt the user to select a calendar date, and upon selection of said calendar date, the system will display all available predefined time periods that contain available time slots whereby each time slot has temporal length equal to user's media or multimedia file's playback duration. The user would also have the option to instead, enter a user defined time period that would contain available time slots, whereby each time slot has temporal length equal to user's media or multimedia file's playback duration.
The system will then display the available schedule items within each selected predefined time, or assigned user defined, time period.

If assisted scheduling 26 is opted for, the user will be prompted to enter a desired user defined playback frequency and a user defined time period, per selected date for user's media or multimedia file's playback. The system will generate a schedule of all possible schedule items, within applicable time period(s), wherein user's defined frequency criterion is met, per date selected.

The following description entails how the time slots, also referred to as schedule items, are configured and generated by the system. Schedule items hold scheduling positions in generated schedules, with each schedule item's temporal length being equal to each respective user media or multimedia file's duration. When assembled, these schedule items encompass the total available time in the generated schedule list, within a selected predefined, or assigned user defined time period, within the selected calendar date. They are generated by algorithmic loops that analyze previously scheduled records of user submitted media and/or multimedia file(s,) per respective calendar date file, if they exist. Any applicable predefined, or user defined, time period with no scheduled records is simply analyzed by, dividing the respective time period by the duration of said media or multimedia file, and creating a whole number of such schedule items that encompass the time beginning from the start of each applicable time period to the end or as close to the end of said time period. If previously scheduled records exist within said time period, the system analyzes: if there is a gap between the beginning of said time period and the beginning of first scheduled record, if there is a gap between the first scheduled record and the following scheduled record, and so on, until it analyzes if there is a gap between the end of the last scheduled record and the end of said time period; once these gaps are identified, the system creates a total number of schedule items equal to number of gaps within said time period that are large enough, temporally, to fit said user media or multimedia file duration.

Upon user submittal and confirmation 27, the server's calendar date, within its respective calendar month file, within its respective calendar year file, with respect to the scheduling data per user media or multimedia, and the corresponding copies of each said calendar type files, located in the storage of the client computer, are updated 29 with said submitted schedule data and the respective media or multimedia file's metadata. If user cancels, the application will terminate the session 28.

Upon submittal and confirmation of schedule data transfer by the user, the system will also deliver a copy of said user's media or multimedia file 30 to respective client computer, if said client computer does not already contain said media or multimedia file in its storage.

Hourly playlists on client computer are assembled 31 every hour on the half hour. Playlists are displayed on respective client computer's digital display every hour on the hour. To assemble playlist, the system routinely scans daily calendar files on an hourly basis and incorporates procedures that assemble records pertinent to next playlist in chronological order. During assembly of the playlist 32, time gaps are identified, which may lie between a multitude of the following positions: between the beginning of the hour playlist and the beginning of the first scheduled record for that hour, between the end of the first scheduled record and the beginning of the next scheduled record, between a number of records in the middle section of the hour, between the end of the second to last scheduled record and the beginning of the last scheduled record, or between the end of the last scheduled record and the end of the hour playlist. With the gaps identified, the playlist assembles, and these gaps are matched with media and/or multimedia files found in a filler folder, which includes many such files of varying durations, and the process fills said gaps with said files, while attempting to use as many of the filler files as possible, limiting the reoccurrence of the same filler file in the playlist.

BEST MODE OF IMPLEMENTATION

1. Below are the recommended hardware requirements for the server:
    Intel i5 or i7 processor;
    RAID 1 compatible motherboard;
    Windows 8 or newer operating system;
    64 GB of RAM for Windows Server 2016 Essentials;
    2×500 GB RAID 1 for Operating System;
    1 TB for data back up
2. Below are the recommended hardware requirements for the client computer and user's computing device:
    Duo Core or high processor;
    2 GB of RAM;
    32-bit or 64-bit Operating System
3. Below are incorporated opensource software tools required for the system to run precisely:
    1. FFMPEG, an open source code platform, which is integrated in the system for efficient handling and encoding of media and multimedia data. Files are encoded to a MP4 format with the H.264 codec. FFMPEG is licensed under GNU Lesser General Public License (LGPL.)
    2. MediaInfo 0.7.62, an open source program, which is integrated in the system to retrieve necessary metadata of media and multimedia files. MediaInfo 0.7.62 is licensed under GNU Lesser General Public License (LGPL.)

What is claimed is:

1. A computer implemented method of uploading media and multimedia files of varying playback duration, whereby said respective playback durations are either user defined or file property attributed, intended for scheduling of their playback on a digital display available in client network, comprising:
    a process that allows a computing device of a user to upload an image media file or a selection of image files;
    stores said image file or files in a data repository;
    receives user input or inputs for a desired playback duration of said image file or files;
    constrains said user input or inputs, per image media file, to be between one second and a maximum duration equal to a predefined time period; encodes, by a computer processor, said image file or files into a benchmark multimedia file type with the attributed playback duration or durations user input previously set;
    stores the new multimedia file or files in a data repository;
    and a process that allows a computing device of a user to upload a media and/or a multimedia file or a selection of media and/or multimedia files; determines if said media and/or multimedia playback duration is longer than one second and does not have a duration longer than a maximum duration equal to a predefined time period;
    accepts the media and/or multimedia file or files that meet previously stated duration requirements;
    stores said accepted media and/or multimedia file or files in a data repository;
    encodes said accepted media and/or multimedia file or files into a benchmark multimedia file type;
    and stores the new multimedia file or files in a data repository.

2. The method of claim 1,
    wherein a user is a digital account holder,
    and wherein all user uploaded media or multimedia files and corresponding encoded multimedia files are attributed to said user account, through database management protocols.

3. A media and multimedia uploading system for files of varying playback duration, whereby said respective playback durations are either user defined or file property attributed, intended for scheduling of their playback on a digital display available in client network, comprising:
    a computer processor, a routing engine executing on the computer processor and configured to:
    allow a computing device of a user to upload an image media file or a selection of image files;
    store said image file or files in a data repository;
    receive user input or inputs for a desired playback duration of said image file or files;
    constrain said user input or inputs, per image media file, to be between one second and a maximum duration equal to a predefined time period;
    encode, by a computer processor, said image file or files into a benchmark multimedia file type with the attributed playback duration or durations user input previously set;
    store the new multimedia file or files in a data repository;
    and a process that allows a computing device of a user to upload a media and/or a multimedia file or a selection of media and/or multimedia files; determine if said media and/or multimedia playback duration is longer than one second and does not have a duration longer than a maximum duration equal to a predefined time period;
    accept the media and/or multimedia file or files that meet previously stated duration requirements;
    store said accepted media and/or multimedia file or files in a data repository;
    encode said accepted media and/or multimedia file or files into a benchmark multimedia file type;
    and store the new multimedia file or files in a data repository.

4. A non-transitory computer readable medium comprising a plurality of instructions for uploading media and multimedia files of varying playback duration, whereby said respective playback durations are either user defined or file property attributed, intended for scheduling their playback on a digital display available in client network, the plurality of instructions comprising functionality to:
    allow a computing device of a user to upload an image media file or a selection of image files;
    store said image file or files in a data repository;
    receive user input or inputs for a desired playback duration of said image file or files;
    constrain said user input or inputs, per image media file, to be between one second and a maximum duration equal to a predefined time period;
    encode, by a computer processor, said image file or files into a benchmark multimedia file type with the attributed playback duration or durations user input previously set;
    store the new multimedia file or files in a data repository;
    and a process that allows a computing device of a user to upload a media and/or a multimedia file or a selection of media and/or multimedia files; determine if said media and/or multimedia playback duration is longer than one second and does not have a duration longer than a maximum duration equal to a predefined time period;

accept the media and/or multimedia file or files that meet previously stated duration requirements;
store said accepted media and/or multimedia file or files in a data repository;
encode said accepted media and/or multimedia file or files into a benchmark multimedia file type;
and store the new multimedia file or files in a data repository.

\* \* \* \* \*